3,178,422
AROMATIC AND ALIPHATIC HYDRAZONE DERIVATIVES OF 1-AMINO-4-DIPHENYLALKYL-PIPERAZINES
John W. Cusic, Skokie, and Ernest F. Le Von, Morton Grove, Ill., assignors to G. D. Searle & Co., Chicago, Ill., a corporation of Delaware
No Drawing. Filed Apr. 4, 1963, Ser. No. 270,525
Claims priority, application Republic of the Philippines, Sept. 17, 1962, 4,397
13 Claims. (Cl. 260—240)

The present invention relates to a group of compounds which are hydrazone derivatives of 1-amino-4-diphenyl-alkylpiperazines and related compounds. More particularly, it relates to compounds having the following general formula

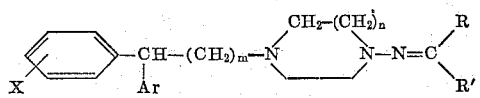

wherein Ar is selected from the group consisting of phenyl, tolyl, halophenyl, methoxyphenyl, trifluoromethylphenyl, and pyridyl; X is selected from the group consisting of hydrogen and halogen; $m$ is a whole number between 0 and 1 inclusive; $n$ is a positive integer less than 3; R is selected from the group consisting of alkyl, alkenyl, cycloalkyl, cycloalkenyl, phenylalkyl, phenylalkenyl, and substituted or unsubstituted monocyclic, dicyclic, or tricyclic aryl radicals, or R can be combined with R' to represent polyalkylene so that R—CO—R' represents a cyclic alkanone and

represents a cyclic alkylidene radical such as cyclohexylidene; R can also be combined with R' to give a biphenylene radical; R' is selected from the group consisting of hydrogen, methyl, phenyl, and, when combined with R, polyalkylene and biphenylene.

The halophenyl radicals referred to above with regard to Ar include fluorophenyl, chlorophenyl, bromophenyl, and iodophenyl. Likewise, the halogens referred to with regard to X include fluorine, chlorine, bromine, and iodine.

More particularly, R in the above formula can represent an aromatic hydrocarbon radical containing up to 14 carbon atoms such as phenyl, tolyl, naphthyl, and anthryl; a halophenyl radical such as fluorophenyl, chlorophenyl, bromophenyl, and iodophenyl; hydroxyphenyl, dihydroxyphenyl; a (lower alkanoyloxy)phenyl radical such as acetoxyphenyl, and propionyloxyphenyl; an alkoxyphenyl radical such as methoxyphenyl, dimethoxyphenyl, and trimethoxyphenyl; methylenedioxyphenyl; a dialkyl-aminoalkoxyphenyl radical such as diethylaminoethoxy-phenyl; nitrophenyl; dimethylaminophenyl; (lower alkanamido)phenyl such as acetamidophenyl and propionamidophenyl wherein the alkanamido portion contains up to six carbon atoms; carboxyphenyl, cyanophenyl, styryl; phenyl(lower alkyl) radicals such as benzyl and phenethyl wherein the lower alkyl portion contained up to 6 carbon atoms; lower alkyl radicals such as methyl, ethyl, propyl, butyl, and like alkyl radicals containing up to 6 carbon atoms; lower alkylene radicals such as vinyl, propenyl, allyl and like alkylene radicals containing up to 6 carbon atoms; cycloalkyl and cyloalkenyl radicals such as cyclohexyl and cyclohexenyl; benzhydryl, biphenylyl and, when combined with R', biphenylylene and polyalkylene radicals such as pentamethylene.

In addition to the substituted phenyl groups referred to above, it should be recognized that R can represent other polysubstituted phenyl radicals such as xylyl, trimethylphenyl, difluorophenyl, dichlorophenyl, hydroxytolyl, fluorotolyl, methoxytolyl, hydroxymethoxyphenyl, and similar polysubstituted phenyl groups. Furthermore, radicals under R such as phenyl(lower alkyl), styryl, naphthyl, and biphenylyl can be further substituted with groups such as methyl, methoxy, halogen, and similar groups.

The compounds of this invention are useful because of their pharmacological properties. In particular, they possess anti-convulsant activity. This is demonstrated by their inhibition of pentylenetetrazole-induced convulsions and their antagonism of electroshock seizures. This activity is unexpected because the corresponding 1-benzyl compounds either possess relatively weak anti-convulsant activity or lack this activity entirely. In addition, the present compounds are inhibitors of hepatic cholesterol synthesis. They have the power to inhibit incorporation of mevalonic acid into unsaponifiable cholesterol precursors.

A preferred embodiment of this invention consists of those compounds in which R is an oxygen-substituted phenyl radical, i.e., wherein R is methoxyphenyl, dimethoxyphenyl, trimethoxyphenyl, or, especially, hydroxyphenyl and methylenedioxyphenyl.

Another preferred embodiment of this invention are those compounds in which R is an aromatic hydrocarbon radical containing up to 10 carbon atoms. Phenyl, tolyl, and naphthyl illustrate this embodiment.

A further preferred embodiment of this invention are those compounds in which R is cyanophenyl.

Another preferred embodiment of this invention are those compounds in which R is halophenyl such as fluorophenyl, chlorophenyl, bromophenyl, and iodophenyl.

The organic bases of this invention form pharmaceutically acceptable, non-toxic, acid addition salts with a variety of organic and inorganic acids. Such salts are formed with acids such as sulfuric, phosphoric, hydrochloric, hydrobromic, hydroiodic, sulfamic, citric, lactic, maleic, malic, succinic, tartaric, cinnamic, acetic, benzoic, gluconic, ascorbic, and related acids.

The compounds of this invention can be prepared by the condensation of the appropriate aldehyde or ketone with a 1-substituted-4-aminopiperazine. The reaction is carried out in an inert solvent. Examples of solvents useful for this purpose are alcohols such as ethanol and 2-propanol or aromatic hydrocarbons such as benzene and toluene. A small amount of acid can be added to the reaction mixture to help catalyze the reaction. Acetic acid is an example of an acid useful for this purpose, and, actually, the reaction can also be carried out using acetic acid as the solvent. When the above reaction is carried out in hydrocarbon solvents, it is desirable to remove the water from the reaction mixture as it is formed by means of an azeotrope trap. In certain instances, an excess of the carbonyl compound reactant can be used as the solvent. The reaction is promoted by the use of elevated temperatures.

The compounds which constitute this invention and their preparation will appear more fully from a consideration of the following examples which are given for the purpose of illustration only and are not to be construed as limiting the invention in spirit or in scope. In these examples, quantities are in parts by weight unless parts by volume are indicated, temperatures are in degrees centigrade (° C.), and pressures are in millimeters of mercury (mm.). The relationship between parts by volume and parts by weight is the same as that between milliliters and grams.

The present application is a continuation-in-part of copending application Serial Number 142,005, filed October 2, 1961, and now abandoned.

Example 1

A mixture of 46 parts of 2-chlorobenzhydryl chloride, 50 parts of piperazine, 30 parts of potassium carbonate, 3 parts of sodium iodide and 480 parts of butanone is stirred and refluxed for 48 hours. The reaction mixture is filtered and the solvent is evaporated from the filtrate. The residue is distributed between benzene and water and the benzene layer is separated and washed with water. It is then extracted twice with 3 N hydrochloric acid and the acid extract is washed with benzene, alkalized, and extracted with benzene. The benzene solution is washed and dried and the solvent is evaporated to give 1-(2-chlorobenzhydryl)piperazine.

If the above procedure is repeated using the appropriate substituted chloride in place of the 2-chlorobenzhydryl chloride, the following compounds are obtained:

1-(4-iodobenzhydryl)piperazine.
1-(4-chlorobenzhydryl)homopiperazine. In this case homopiperazine is used in place of piperazine.
1-(2-methylbenzhydryl)piperazine.
1-[α-(2-pyridyl)benzyl]piperazine.
1-[α-(3-pyridyl)benzyl]piperazine.

Example 2

To a suspension of 200 parts of 1-benzhydrylpiperazine and 400 parts of water is added gradually 190 parts of concentrated hydrochloric acid with cooling in an ice bath. The resultant mixture is stirred for 1 hour, the insoluble material is filtered off and the filtrate is cooled to 10° C. A solution of 57 parts of sodium nitrite and 200 parts of water is added portionwise over a period of 3 hours. The precipitate which forms is filtered off, washed with dilute hydrochloric acid and dried overnight. Recrystallization of the product from 790 parts of absolute ethanol gives the purified hydrochloride which is then suspended in 1000 parts of water and 1760 parts of benzene. A slight excess of aqueous sodium hydroxide is added and the mixture is stirred until all the solid has dissolved. The benzene solution is separated, washed with water, and dried and the solvent is evaporated. The residual base is recrystallized from heptane to give 1-benzhydryl-4-nitrosopiperazine melting at about 110–111° C.

If the above procedure is repeated using the appropriate substituted 1-benzhydrylpiperazine, the following compounds are obtained:

1-(2-chlorobenzhydryl)-4-nitrosopiperazine melting at about 117–119° C.
1-(4-iodobenzhydryl)-4-nitrosopiperazine.
1-(2-methylbenzhydryl)-4-nitrosopiperazine melting at about 104–106° C. after recrystallization from hexane.
1-(4-chlorobenzhydryl)-4-nitrosohomopiperazine.

Example 3

A solution of 86 parts of 1-(4-chlorobenzhydryl)piperazine and 500 parts of water containing 24 parts of hydrogen chloride is nitrosated with 21 parts of sodium nitrite in 100 parts of water. The reaction mixture is made alkaline by the addition of sodium hydroxide solution and an oily layer forms. The oily product is separated and crystallized from a mixture of 45 parts of ethyl acetate and 700 parts of n-heptane. The resultant solid is recrystallized from a mixture of 2-propanol and hexane and then from a mixture of ethyl acetate and heptane to give 1-(4-chlorobenzhydryl)-4-nitrosopiperazine melting at about 121–123° C.

In a similar manner, 39 parts of 1-[α-(2-pyridyl)benzyl]piperazine is dissolved in 48 parts of concentrated hydrochloric acid and 150 parts of water and cooled to 5° C. A solution of 17 parts of sodium nitrite in 85 parts of water is added portionwise while maintaining the temperature at about 5° C. The resultant mixture is stirred for 4 hours with cooling before it is warmed to room temperature and made alkaline with dilute sodium hydroxide solution. The resultant mixture is extracted with ether and the ether extract is dried and the solvent is removed to give 1-[α-(2-pyridyl)benzyl]-4-nitrosopiperazine. 1-[α-(3-pyridyl)benzyl]-4-nitrosopiperazine is obtained from 1-[α-(3-pyridyl)benzyl]piperazine in the same way.

Example 4

4-chloro-4'-methylbenzhydryl chloride is prepared by refluxing a mixture of 4-chloro-4'-methylbenzhydrol with thionyl chloride and a trace of pyridine in chloroform. Distillation of the reaction mixture gives the desired product boiling at about 165–175° C. at 0.1–0.4 mm. and melting at about 43–45.5° C.

A mixture of 10 parts of 4-chloro-4'-methylbenzhydryl chloride, 6 parts of 1-nitrosopiperazine, 10 parts of potassium carbonate, and 1 part of sodium iodide in 160 parts of 2-butanone is stirred and refluxed for 4 days. The reaction mixture is filtered and the solvent is evaporated from the filtrate. The resultant residue is dissolved in benzene and the benzene solution is washed with two portions of 10% acetic acid and then with water and dried. Evaporation of the solvent from the benzene solution leaves a residue which is recrystallized from 80 parts of 2-propanol to give 1-(4-chloro-4'-methylbenzhydryl)-4-nitrosopiperazine melting at about 125–128° C. In the same way, 1-(4-trifluoromethylbenzhydryl)-4-nitrosopiperazine is obtained from 4-trifluoromethylbenzhydryl chloride and 1-nitrosopiperazine.

In a similar manner, 5.5 parts of 4-fluorobenzhydryl chloride, 6 parts of 1-nitrosopiperazine, 0.6 part of potassium iodide, 10 parts of potassium carbonate, and 200 parts of butanone are stirred at reflux for 4 days. Isolation of the product is carried out as indicated above, except that the acidic washes are omitted. In this case, the product is 1-(4-fluorobenzhydryl)-4-nitrosopiperazine. 1-(4-methoxybenzhydryl)-4-nitrosopiperazine is prepared from 4-methoxybenzhydryl chloride and 1-nitroso piperazine by the same procedure.

Example 5

A mixture of 15 parts of 3-chlorobenzhydryl chloride and 7.4 parts of 1-nitrosopiperazine in 245 parts of dry pyridine is refluxed for 1.5 hours. The solvent is evaporated from the reaction mixture and the residue is distributed between benzene and water. The benzene layer is separated and dried over potassium carbonate and the solvent is evaporated to give a brown oil which is crude 1-(3-chlorobenzhydryl)-4-nitrosopiperazine. This material is suitable for reduction without additional purification.

Example 6

A mixture of 22 parts of 4,4'-dichlorobenzhydryl chloride and 10 parts of 1-nitroso piperazine in 180 parts of triethylamine is refluxed for 6 days. The resultant mixture is diluted with 440 parts of benzene and washed with 6 portions of water, twice with 10% aqueous acetic acid, and twice more with water. The benzene solution is dried over potassium carbonate, the solvent is evaporated, and the residue is recrystallized from n-hexane and then from ethyl acetate to give 1-(4,4'-dichlorobenzhydryl)-4-nitrosopiperazine melting at about 156–160° C.

Example 7

A solution of 10 parts of 1-benzhydryl-4-nitrosopiperazine in 140 parts of anhydrous ether and 5 parts of benzene is added portionwise to a suspension of 1.9 parts of lithium aluminum hydride in 140 parts of ether. The reaction mixture is stirred for 1 hour at room temperature and then refluxed and stirred for 2 hours. The reaction mixture is cooled in an ice bath and excess lithium aluminum hydride is decomposed by the addition of ethyl acetate. The reaction mixture is hydrolyzed by the dropwise addition of 2 parts of water, 2 parts of 20% sodium hydroxide solution and 6 parts of water. The inorganic salts are filtered off and washed with ether and the resultant filtrate is dried over sodium sulfate. The solvent is evaporated, the residue is dissolved in benzene and the solvent is evaporated once again to give 1-benzhydryl-4-aminopiperazine melting at about 106–109° C. Recrystallization from ether raises the melting point to about 108–111° C.

If equivalent quantities of the appropriate 1-substituted 4-nitrosopiperazine are used in the above procedure, the following compounds are obtained. Variations in the solvent used are indicated after the name of the compound thus prepared.

1-(4-fluorobenzhydryl)-4-aminopiperazine melting at about 88–99° C.

1-(2-chlorobenzhydryl)-4-aminopiperazine. In this case tetrahydrofuran is used in place of benzene to dissolve the nitroso compound.

1-(3-chlorobenzhydryl)-4-aminopiperazine. The hydrochloride of this compound melts at about 180–190° C. with decomposition.

1-(4-chlorobenzhydryl)-4-aminopiperazine melting at about 116–121° C.

1-(4-chlorobenzhydryl)-4-aminohomopiperazine.

1-(4,4'-dichlorobenzhydryl)-4-aminopiperazine. A mixture of tetrahydrofuran and ether (2:5) is used as the solvent for the reduction in this instance.

1-(4-iodobenzhydryl)-4-aminopiperazine.

1-(2-methylbenzhydryl)-4-aminopiperazine.

1-(4-chloro-4'-methylbenzhydryl)-4-aminopiperazine. In this case tetrahydrofuran is used in place of benzene to dissolve the nitroso compound.

1-(4-methoxybenzhydryl)-4-aminopiperazine. A 1:2 mixture of tetrahydrofuran and ether is used as the solvent for the reduction.

1-(4-trifluoromethylbenzhydryl)-4-aminopiperazine.

1-[α-(2-pyridyl)benzyl]-4-aminopiperazine. In this case the reaction is carried out in tetrahydrofuran and the crude product is used without further purification.

1-[α-(3-pyridyl)benzyl]-4-aminopiperazine.

*Example 8*

A mixture of 110 parts of triethylamine, 36 parts of 1-nitrosopiperazine and 375 parts of chloroform is heated to 60–65° C. A solution of 70 parts of diphenyl-acetyl chloride in 150 parts of chloroform is then added portionwise. The resultant mixture is heated at 70–75° C. for an additional 3 hours and it is then cooled to room temperature. An additional 25 parts of chloroform is added and the resultant mixture is washed with several portions of water. The chloroform layer is dried and the solvent is evaporated to give the crude solid product. This solid is washed with ether to give 1-diphenylacetyl-4-nitrosopiperazine melting at about 149–151° C.

16 parts of 1-diphenylacetyl-4-nitrosopiperazine is placed in the thimble of a continuous extractor and a solution of 15 parts of lithium aluminum hydride in 875 parts of ether is placed in the flask of the extractor. The ether solution is refluxed for 21 hours to bring the nitroso compound into contact with the reducing mixture. The ether solution is then cooled to 5° C. and decomposed by the cautious addition of water. The ether layer is then separated and dried and the solvent is evaporated to give 1-(2,2-diphenylethyl)-4-aminopiperazine as an oil. This product is used without further purification.

If 4-chlorodiphenylacetyl chloride is substituted for the diphenylacetyl chloride and the procedure of the preceding two paragraphs is repeated, there is obtained 1-[2-(4-chlorophenyl)-2-phenylethyl]-4-aminopiperazine.

*Example 9*

To a solution of 10 parts of 1-(4-chlorobenzhydryl)-4-aminopiperazine in 119 parts of warm 2-propanol is added 3.6 parts of benzaldehyde. The solution is boiled for 5 minutes and allowed to cool slowly. A pale yellow solid crystallizes from the solution and it is recrystallized from 2-propanol to give 1-(4-chlorobenzhydryl)-4-benzalaminopiperazine melting at about 97–99° C. This compound has the following formula

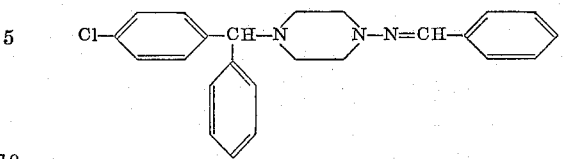

*Example 10*

1-benzhydryl-4-aminopiperazine is reacted with benzaldehyde according to the procedure described in Example 9. In this case, the product is 1-benzhydryl-4-benzalaminopiperazine melting at about 131–132° C.

In the same way, 1-(2-methylbenzhydryl)-4-aminopiperazine is reacted with benzaldehyde to give 1-(2-methylbenzhydryl)-4-benzalaminopiperazine melting at 107–111° C.

*Example 11*

If 1-(3-chlorobenzhydryl)-4-aminopiperazine is reacted with benzaldehyde according to the procedure described in Example 9, the product is 1-(3-chlorobenzhydryl)-4-benzalaminopiperazine melting at about 135–137° C.

Likewise, 1-(4-iodobenzhydryl)-4-aminopiperazine reacts with benzaldehyde to give 1-(4-iodobenzhydryl)-4-benzalaminopiperazine.

In the same manner, 1-(4-fluorobenzhydryl)-4-aminopiperazine is reacted with benzaldehyde. However, absolute ethanol containing 0.1 part of acetic acid replaces the 2-propanol as the solvent. The product of the reaction is 1-(4-fluorobenzhydryl)-4-benzalaminopiperazine melting at about 114–116.5° C.

*Example 12*

The procedure of Example 9 is repeated using 1-(4,4'-dichlorobenzhydryl)-4-aminopiperazine and benzaldehyde as the reactants, ethanol as the solvent, and, additionally, 0.1 part of acetic acid. The product is 1-(4,4'-dichlorobenzhydryl)-4-benzalaminopiperazine melting at about 152–154° C. when dried at 100° C. for 3 hours under vacuum.

In the same way, 1-(4-trifluoromethylbenzhydryl)-4-piperazine reacts with benzaldehyde to give 1-(4-trifluoromethylbenzhydryl)-4-benzalaminopiperazine melting at about 121–123° C. after recrystallization from absolute ethanol.

*Example 13*

1-(4-methoxybenzhydryl)-4-aminopiperazine is reacted with benzaldehyde according to the procedure described in Example 9. In this case the product is 1-(4-methoxybenzhydryl)-4-benzalaminopiperazine melting at about 150–152° C.

*Example 14*

1-(2,2-diphenylethyl)-4-aminopiperazine and 1-[2-(4-chlorophenyl)-2-phenylethyl]-4-aminopiperazine are each reacted with benzaldehyde, using 2-propanol as the solvent and 0.1 part of acetic acid as catalyst, to give, respectively, 1-(2,2-diphenylethyl)-4-benzalaminopiperazine melting at about 117–118° C. and 1-[2-(4-chlorophenyl)-2-phenylethyl]-4-benzalaminopiperazine melting at about 112–114° C. The procedure used is essentially the same as that described in Example 9.

In the same manner, 1-benzhydryl-4-aminopiperazine is reacted with 4-phenylbenzaldehyde to give 1-benzhydryl-4-(4-phenylbenzalamino)piperazine which melts at about 169–170° C. after recrystallization from 2-propanol.

Likewise, 1-[α-(2-pyridyl)benzyl]-4-aminopiperazine is reacted with benzaldehyde to give 1-[α-(2-pyridyl)benzyl]-4-benzalaminopiperazine melting at 141–142° C.

Example 15

A mixture of 5 parts of 1-benzhydryl-4-aminopiperazine, 3.5 parts of 2-naphthaldehyde, and 264 parts of benzene is refluxed in a reaction vessel equipped with a reflux condenser and an azeotrope trap. Refluxing is continued until no more water distills from the mixture. The benzene solvent is then evaporated from the solution and the residue is recrystallized from benzene to give a crude product which is further recrystallized from a mixture of benzene and hexane. This gives 1-benzhydryl-4 - (2 - naphthylmethyleneamino)piperazine melting at about 168–168.5° C.

If 3.5 parts of 1-naphthaldehyde is substituted for the 2-naphthaldehyde and the above procedure is repeated, the product is 1-benzhydryl - 4 - (1 - naphthylmethyleneamino)piperazine melting at about 165° C. This compound has the following formula

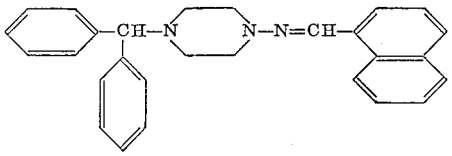

Example 16

1-(2-chlorobenzhydryl)-4-aminopiperazine is reacted with benzaldehyde according to the procedure described in Example 15. The product is 1-(2-chlorobenzhydryl)-4-benzalaminopiperazine melting at about 147–150° C.

Example 17

If the procedure of Example 9 is repeated using an equivalent quantity of 1-(4-chlorobenzhydryl)-4-aminohomopiperazine in place of the 1-(4-chlorobenzhydryl)-4-aminopiperazine, the product obtained is 1-(4-chlorobenzhydryl)-4 - benzalaminohomopiperazine melting at about 138–142° C.

Example 18

1-benzhydryl-4-aminopiperazine is reacted with acetophenone according ot the procedure described in Example 9. The product is 1-benzhydryl-4-(α-methylbenzalamino)piperazine melting at about 162–164° C. This compound has the following formula

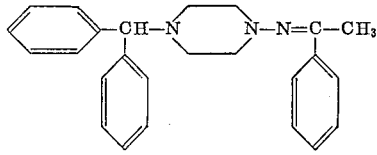

Example 19

1-benzhydryl-4-aminopiperazine is reacted with 2-tolualdehyde according to the procedure described in Example 9. The product obtained is 1-benzhydryl-4-(2-methylbenzalamino)piperazine melting at about 130–131° C.

If 1-benzhydryl-4-aminopiperazine is reacted with 4-tolualdehyde according to the procedure described in Example 9, the product obtained is 1-benzhydryl-4-(4-methylbenzalamino)piperazine melting at about 177–178° C.

Example 20

The procedure of Example 15 is repeated using an equivalent quantity of 4-fluorobenzaldehyde in place of the 2-naphthaldehyde. The product obtained is 1-benzhydryl - 4 - (4 - fluorobenzalamino)piperazine melting at about 128–130° C.

Example 21

2-chlorobenzaldehyde is reacted with 1-benzhydryl-4-aminopiperazine according to the procedure described in Example 9. In this case the product is 1-benzhydryl-4-(2-chlorobenzalamino)piperazine melting at about 165–167° C.

If 3-chlorobenzaldehyde is reacted with 1-benzhydryl-4-aminopiperazine according to the procedure described in Example 9, the product is 1-benzhydryl-4-(3-chlorobenzalamino)piperazine melting at about 105–107° C.

Likewise, 4-chlorobenzaldehyde is reacted with 1-benzhydryl-4-aminopiperazine to give 1-benzhydryl-4-(4-chlorobenzalamino)piperazine melting at about 148–150° C.

If 4-iodobenzaldehyde is reacted with 1-benzhydryl-4-aminopiperazine according to the procedure described in Example 9, the product is 1-benzhydryl-4-(4-iodobenzalamino)piperazine.

Example 22

The procedure of Example 9 is repeated using 1-benzhydryl-4-aminopiperazine and 4-hydroxybenzaldehyde as the reactants. In the isolation of the product, the solvent is evaporated from the reaction mixture and the residue is recrystallized first from benzene, then from a mixture of ethyl acetate and n-hexane, and finally from a mixture of benzene and n-heptane. The resultant product, after being dried at 110° C., melts at about 158–159° C. It is 1-benzhydryl-4-(4-hydroxybenzalamino)piperazine.

Similarly, 1-benzhydryl-4-aminopiperazine is reacted with 3-hydroxybenzaldehyde to give 1-benzhydryl-4-(3-hydroxybenzalamino)piperazine and with 4-acetoxybenzaldehyde to give 1-benzhydryl-4-(4-acetoxybenzalamino)piperazine.

Example 23

1-(2,2-diphenylethyl)-4-aminopiperazine and 1-[α-(2-pyridyl)benzyl]-4-aminopiperazine are each reacted with 4-hydroxybenzaldehyde, using 2-propanol as the solvent and 0.1 part of acetic acid as catalyst, to give respectively, 1-(2,2-diphenylethyl) - 4 - (4-hydroxybenzalamino)piperazine melting at about 148–149° C. and 1-[α-(2-pyridyl)-benzyl]-4-(4-hydroxybenzalamino)piperazine melting at about 214–215° C. The procedure used is essentially the same as that described in Example 9. The latter compound has the following formula

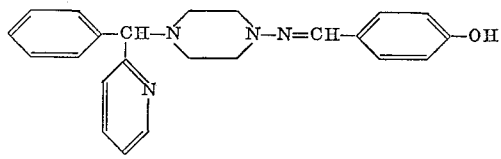

Example 24

1-(4-chlorobenzhydryl - 4 - aminopiperazine is reacted with 4-hydroxybenzaldehyde according to the procedure described in Example 15. In this case, the crude product is recrystallized first from a mixture of ethyl acetate and n-hexane and then from a mixture of ethyl acetate and n-pentane. The product thus obtained, 1-(4-chlorobenzhydryl)-4-(4-hydroxybenzalamino)piperazine containing ½ mole of ethyl acetate, melts at about 110–117° C.

Example 25

A mixture of 10 parts of 1-(4-chlorobenzhydryl)-4-aminopiperazine, 5 parts of piperonal, 2 parts of glacial acetic acid, and 530 parts of benzene is refluxed in a vessel provided with an azeotrope trap. Reflux is continued until the calculated amount of water has separated. This requires about 2 hours. The reaction mixture is cooled, washed with aqueous sodium hydroxide solution and then with water, and dried over potassium carbonate. The solvent is evaporated from the solution under reduced pressure and the residual syrup is crystallized from 2-propanol to give 1-(4-chlorobenzhydryl)-4-(3,4-methylenedioxybenzalamino)piperazine melting at about 128–133° C.

If 1-(2-chlorobenzhydryl)-4-aminopiperazine is reacted with piperonal in the same manner, the product is 1-(2- chlorobenzhydryl) - 4(3,4 - methylenedioxybenzalamino) piperazine. This compound has the following formula

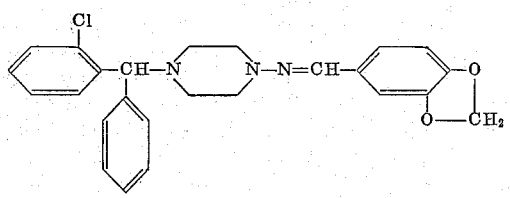

Example 26

If an equivalent quantity of 1-benzhydryl-4-aminopiperazine is substituted for the 1-(4-chlorobenzhydryl)-4-aminopiperazine and the procedure of Example 25 is repeated, the product is 1-benzhydryl-4-(3,4-methylenedioxybenzalamino)piperazine melting at about 144–145° C.

Likewise, if an equivalent quantity of 1-(4-chloro-4'-methylbenzhydryl)-4-aminopiperazine is substituted for the 1-(4-chlorobenzhydryl)-4-aminopiperazine and the same procedure is repeated, the product is 1-(4-chloro-4'-methylbenzhydryl) - 4 - (3,4-methylenedioxybenzalamino)piperazine melting at about 180–181° C.

Example 27

4 parts of 1-(2,2-diphenylethyl)-4-aminopiperazine, 2.2 parts of piperonal and 0.1 part of acetic acid in 40 parts of 2-propanol is heated on a steam bath for about 5 minutes. The resultant mixture is allowed to cool and the solid which forms is separated and recrystallized from 2-propanol to give 1-(2,2-diphenylethyl)-4-(3,4-methylenedioxybenzalamino)piperazine melting at about 131–133° C.

In the same way, 1-[2-(4-chlorophenyl)-2-phenylethyl]-4-aminopiperazine is reacted with piperonal to give 1-[2-(4-chlorophenyl)-2-phenylethyl]-4-(3,4-methylenedioxybenzalamino)piperazine melting at about 143–145° C. This compound has the following formula

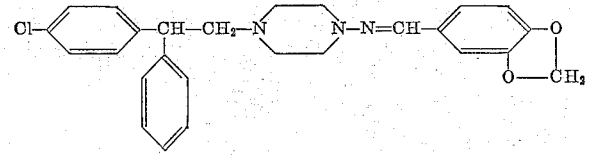

Example 28

A mixture of 6 parts of 1-[α-(2-pyridyl)benzyl]-4-aminopiperazine, 3.5 parts of piperonal, 48 parts of 2-propanol, and 0.1 part of acetic acid is heated on a steam bath for 20 minutes. The mixture is allowed to cool and the crystals which form are separated and recrystallized from a mixture of benzene and n-hexane to give 1-[α-(2-pyridyl)benzyl] - 4 - (3,4-methylenedioxybenzalamino)piperazine melting at about 141–143° C. This compound has the following formula

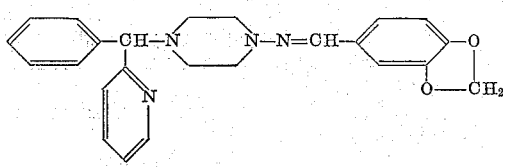

In the same way, 1-[α-(3-pyridyl)benzyl]-4-aminopiperazine is reacted in the piperonal to give 1-[α-(3-pyridyl]-4-(3,4-methylenedioxybenzalamino)piperazine.

Example 29

1-benzhydryl-4-aminopiperazine is reacted with 4-methoxybenzaldehyde according to the procedure described in Example 9. The product is 1-benzhydryl-4-(4-methoxybenzalamino)piperazine melting at about 146–149° C.

Likewise, when 1-benzhydryl-4-aminopiperazine is reacted with 2-methoxybenzaldehyde, the product is 1-benzhydryl-4-(2-methoxybenzalamino)piperazine melting at about 146–148° C.

Example 30

The procedure of Example 9 is repeated using 1-benzhydryl - 4 - aminopiperazine and 2,4-dimethoxybenzaldehyde as the reactants. The product is 1-benzhydryl-4-(2,4-dimethoxybenzalamino)piperazine.

Likewise, if the procedure of Example 9 is repeated using 1-benzhydryl-4-aminopiperazine and 3,4-dimethoxybenzaldehyde as the reactants, the product is 1-benzhydryl-4-(3,4-dimethoxybenzalamino)piperazine melting at about 176–177.5° C.

Example 31

1-benzhydryl-4-aminopiperazine is reacted with 3,4,5-trimethoxybenzaldehyde according to the procedure described in Example 25. The product obtained is 1-benzhydryl-4-(3,4,5-trimethoxybenzalamino)piperazine melting at about 163–165° C.

Example 32

If an equivalent quantity of vanillin is substituted for the benzaldehyde and the procedure of Example 9 is repeated, the product is 1-(4-chlorobenzhydril)-4-(4-hydroxy-3-methoxybenzalamino)piperazine.

Likewise, protocatechualdehyde reacts with 1-(4-chlorobenzhydryl)-4-aminopiperazine to give 1-(4-chlorobenzhydryl)-4-(3,4-dihydroxybenzalamino)-piperazine.

Example 33

1-benzhydryl-4-aminopiperazine is reacted with 4-(β-diethylaminoethoxy)benzaldehyde according to the procedure of Example 25. Isolation of the product in the usual manner gives 1-benzhydryl-4-[4-(β-diethylaminoethoxy)-benzalamino]piperazine melting at about 75–78° C. This compound has the following formula

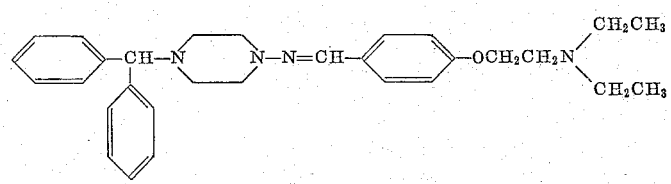

Example 34

If an equivalent quantity of 4-nitrobenzaldehyde is substituted for the 2-naphthaldehyde and the procedure of Example 15 is repeated, the product is 1-benzhydryl-4-(4-nitrobenzalamino)piperazine melting at about 125–128° C.

Example 35

1-benzhydryl-4-aminopiperazine is reacted with 4-dimethylaminobenzaldehyde according to the procedure described in Example 25. The product obtained is 1-benzhydryl-4-(4-dimethylaminobenzalamino)piperazine melting at about 179–181° C.

Example 36

An equivalent quantity of 4-acetamidobenzaldehyde is substituted for the piperonal and the procedure of Example 25 is repeated. The crude product is crystallized from benzene, washed with a mixture of benzene and cyclohexane, and vacuum dried at 100° C. This product is 1 - (4 - chlorobenzhydryl)-4-(4 - acetamidobenzalamino)-piperazine and it melts at about 188–189.5° C.

Likewise, 4 - propionamidobenzaldehyde reacts with 1-(4-chlorobenzhydryl)-4-aminopiperazine to give 1-(4-chlorobenzhydryl) - 4 - (4 - propionamidobenzalamino)-piperazine.

*Example 37*

The procedure of Example 15 is repeated using 1-benzhydryl-4-aminopiperazine and 4-cyanobenzaldehyde as the reactants. The crude product is recrystallized first from a mixture of benzene and n-heptane, twice from benzene, and then three times from ethyl acetate. The solid is finally dried at 100° C. under reduced pressure to give 1-benzhydryl - 4 - (4-cyanobenzalamino)piperazine melting at about 142–146° C. If 3-cyanobenzaldehyde is substituted for 4-cyanobenzaldehyde in the above procedure, the product is 1-benzhydryl-4-(3-cyanobenzalamino)piperazine.

Likewise, 1-(4-chlorobenzhydryl)-4-aminopiperazine is reacted with 4-cyanobenzaldehyde. The crude product is crystallized first from ethyl acetate, then from a mixture of ethyl acetate and n-heptane, and finally from absolute ethanol. The product is dried under vacuum at room temperature to give 1-(4-chlorobenzhydryl)-4-(4-cyanobenzalamino)piperazine containing ⅓ mole of ethanol of crystallization and melting at about 92–96° C. 1-(4-chlorobenzhydryl)-4-(3 - cyanobenzalamino)piperazine is likewise obtained from the reaction of 1-(4-chlorobenzhydryl)-4-aminopiperazine with 3-cyanobenzaldehyde.

*Example 38*

The procedure of Example 27 is repeated but in this case 4-cyanobenzaldehyde is reacted with 1-(2,2-diphenylethyl)-4-aminopiperazine and with 1-[2-(4-chlorophenyl)-2-phenylethyl]-4-aminopiperazine. The products obtained are, respectively, 1-(2,2-diphenylethyl)-4-(4-cyanobenzalamino)piperazine melting at about 163-165° C. and 1-[2-(4-chlorophenyl)-2-phenylethyl] - 4-(4-cyanobenzalamino)piperazine melting at about 142–144° C.

*Example 39*

An equivalent quantity of terephthalaldehydic acid is substituted for the 2-naphthaldehyde and the procedure of Example 15 is repeated. The product is 1-benzhydryl-4-(4-carboxybenzalamino)piperazine melting at about 235–236° C.

*Example 40*

An equivalent quantity of hydrocinnamaldehyde is substituted for the 2-naphthaldehyde and the procedure of Example 15 is repeated. The product is 1-benzhydryl-4-hydrocinnamalaminopiperazine melting at about 115–117° C.

*Example 41*

An equivalent quantity of phenylacetone is substituted for the piperonal and the procedure of Example 25 is repeated. The product obtained is crystallized first from n-hexane and then from a mixture of n-hexane and n-heptane to give 1-(4-chlorobenzhydryl)-4-(1-methyl-2-phenylethylideneamino)piperazine melting at about 144–147° C. This compound has the following formula

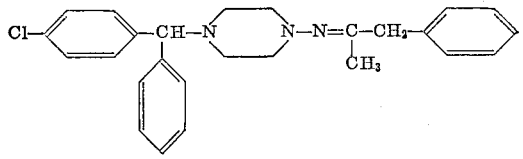

*Example 42*

1-benzhydryl-4-aminopiperazine is reated with cinnamaldehyde according to the procedure described in Example 9. The product obtained is 1-benzhydryl-4-cinnamalaminopiperazine melting at about 155–156° C.

*Example 43*

Reaction of 1-benzhydryl-4-aminopiperazine with diphenylacetaldehyde according to the procedure described in Example 25 gives 1-benzhydryl-4-(2,2-diphenylethylideneamino)piperazine melting at about 118–119° C. after recrystallization from ethanol.

*Example 44*

1-(4-chlorobenzhydryl)-4-aminopiperazine is reacted with diphenylacetaldehyde according to the procedure described in Example 15. To isolate and purify the product, the solvent is evaporated from the reaction mixture, the residue is dissolved in n-hexane, and the hexane is evaporated to give a solid which is recrystallized from ethanol. The product obtained in this way is 1-(4-chlorobenzhydryl)-4-(2,2-diphenylethylideneamino)piperazine melting at about 138–140.5° C.

*Example 45*

A mixture of 5 parts of 1-benzhydryl-4-aminopiperazine, 3.4 parts of benzophenone, 265 parts of toluene, and 3 parts of 4-toluenesulfonic acid is refluxed for 4 hours. The dark reaction mixture is washed with aqueous sodium hydroxide solution and then with water and dried over anhydrous potassium carbonate. The residue crystallizes partially on standing and is triturated with 2-propanol. The crude solid thus obtained is recrystallized from 2-propanol to give 1-benzhydryl-4-(α-phenylbenzalamino) piperazine melting at about 143–145° C.

*Example 46*

1-benzhydryl-4-(fluoren - 9 - ylideneamino)piperazine, melting at about 184–187° C., is obtained from the reaction of 1-benzhydryl-4-aminopiperazine with fluorenone according to the procedure described in Example 9. In this case, a drop of acetic acid is included in the reaction mixture as catalyst.

*Example 47*

1-(4-chlorobenzhydryl)-4-aminopiperazine is reacted with 9-anthaldehyde using ethanol as the solvent and a drop of acetic acid as catalyst. The procedure is essentially the same as that described in Example 9. The crude product is recrystallized from ethyl acetate and then dried at 100° C. under reduced pressure to give 1-(4-chlorobenzhydryl)-4 - (9 - anthrylmethyleneamino)piperazine melting at about 140–144° C.

*Example 48*

A mixture of 5 parts of 1-benzhydryl-4-aminopiperazine and 160 parts of acetone is heated on a steam bath until the excess acetone has distilled off. The residue crystallizes on standing and is recrystallized from a minimum amount of acetone to give 1-benzhydryl-4-isopropylideneaminopiperazine melting at about 113–114.5° C. This compound has the following formula

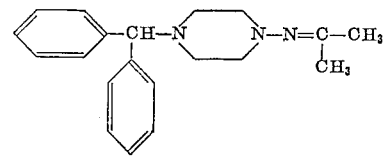

*Example 49*

1-benzhydryl-4-aminopiperazine is reacted with cyclohexanone according to the procedure described in Example 9. The product obtained is 1-benzhydryl-4-cyclohexylideneaminopiperazine melting at about 119–121° C.

*Example 50*

If an equivalent quantity of the appropriate aldehyde is substituted for the 2-naphthaldehyde and the procedure of Example 15 is repeated, the following compounds are obtained:

1-benzhydryl-4-hexylideneaminopiperazine melting at about 59–62° C.

1 - benzhydryl - 4 - (1,2,5,6 - tetrahydrobenzalamino)-piperazine melting at about 87–90° C.

1 - benzhydryl - 4 - hexahydrobenzalaminopiperazine melting at about 86–87° C.

What is claimed is:
1. A compound of the formula

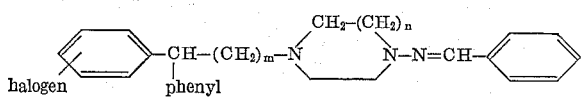

where $m$ is a whole number between 0 and 1 inclusive and $n$ is a positive integer less than 3.

2. A compound of the formula

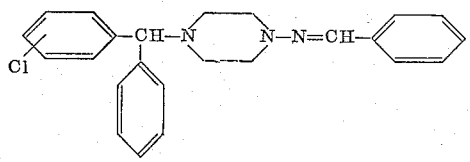

3. 1-(4-chlorobenzhydryl) - 4 - benzalaminopiperazine.
4. A compound of the formula

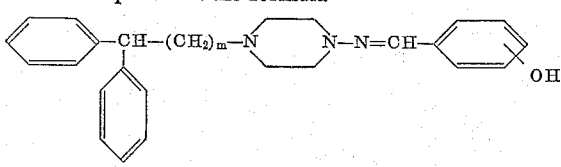

wherein $m$ is a whole number between 0 and 1 inclusive.

5. 1 - benzhydryl-4-(4-hydroxybenzalamino) - piperazine.
6. 1 - (4-chlorobenzhydryl)-4-(4-hydroxybenzalamino)piperazine.
7. A compound of the formula

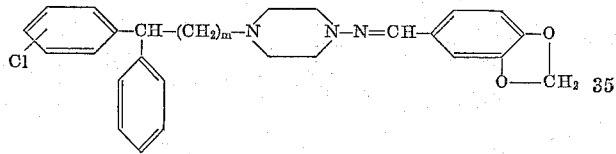

wherein $m$ is a whole number between 0 and 1 inclusive.

8. 1 - (4 - chlorobenzhydryl)-4-(3,4-methylenedioxybenzalamino)piperazine.

9. 1-[2-(4-chlorophenyl) - 2 - phenylethyl] - 4 - (3,4-methylenedioxybenzalamino)piperazine.
10. A compound of the formula

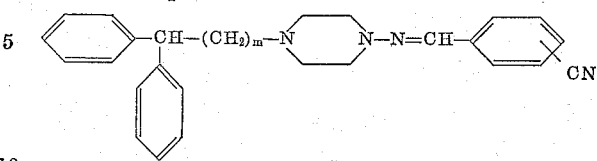

wherein $m$ is a whole number between 0 and 1 inclusive.

11. 1-benzhydryl - 4 - (4 - cyanobenzalamino) - piperazine.
12. A compound of the formula

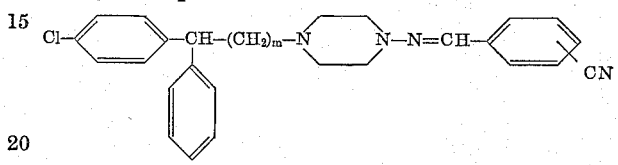

wherein $m$ is a whole number between 0 and 1 inclusive.

13. 1-(4-chlorobenzhydryl) - 4 - (4 - cyanobenzalamino)piperazine.

References Cited in the file of this patent
UNITED STATES PATENTS

| | | |
|---|---|---|
| 2,566,225 | Mackay et al. | Aug. 28, 1951 |
| 2,663,706 | Conroy | Dec. 22, 1953 |
| 2,882,271 | Janssen et al. | Apr. 14, 1959 |
| 2,967,865 | Rudner | Jan. 10, 1961 |
| 3,035,976 | Kimura | May 22, 1962 |
| 3,054,791 | Yale et al. | Sept. 18, 1962 |
| 3,093,631 | Grob et al. | June 11, 1963 |
| 3,098,066 | Mull | July 16, 1963 |
| 3,105,078 | Ayer | Sept. 24, 1963 |

FOREIGN PATENTS

| | | |
|---|---|---|
| 715,236 | Great Britain | Sept. 8, 1954 |
| 920,249 | Germany | Nov. 18, 1954 |
| 942,029 | Germany | Apr. 26, 1956 |